United States Patent Office 3,018,051
Patented Jan. 23, 1962

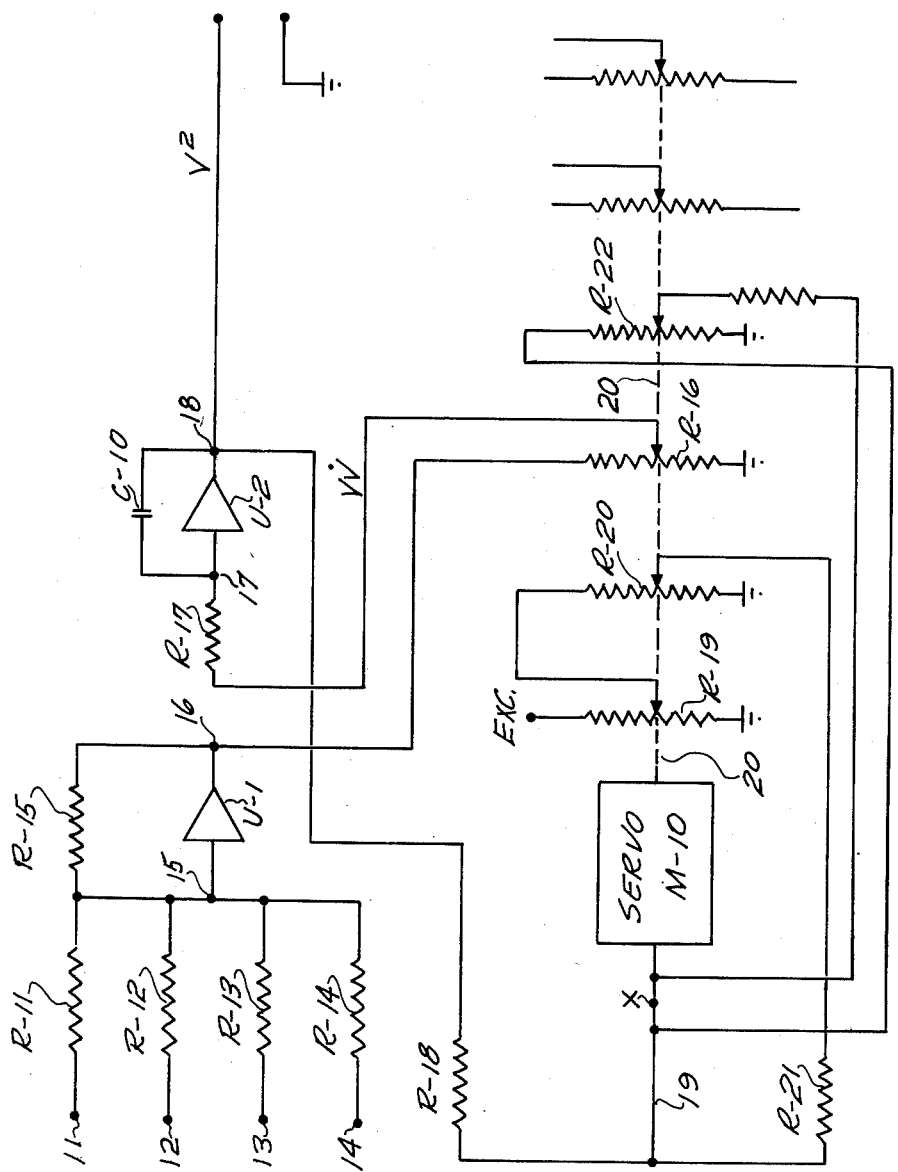

3,018,051
ANALOG COMPUTER APPARATUS
Harold S. Hemstreet, Binghamton, N.Y., assignor to General Precision Inc., a corporation of Delaware
Filed Oct. 17, 1958, Ser. No. 767,975
5 Claims. (Cl. 235—193)

This invention relates to method and apparatus for use in analog computers, automatic control and instrumentation, and more specifically to an improved method and apparatus for deriving an output potential commensurate with the square of a variable from an input potential commensurate with the rate of change of said variable. In numerous analog computer applications it is often necessary or desirable to obtain such a "squared" voltage, and in very many instances it is imperative that the derived "square voltage" be free from certain errors commonly incident to electromechanical function generation. Such errors, often termed "noise," are usually associated with servo multipliers or servo function generators, and arise due to inertia, backlash, friction, hysteresis and like limitations of presently available servo equipment and finite resolution and other defects of servo-driven potentiometers, and consist of step jumps in electrical signals.

Probably the most obvious way to derive a square output potential from a rate input potential is to use a "velocity" or integrating servo, the integrating servo being positioned in accordance with the variable and being used to position a single square function potentiometer or a pair of cascaded linear potentiometers to provide an output potential commensurate with the square of the servo output shaft position. Such a system magnifies the electromechanical limitations of the velocity servo and the potentiometers.

It has been proposed heretofore to minimize such electromechanical errors by using an electronic integrator (a direct-coupled operational amplifier with a feedback capacitor, or "Miller" integrator) to integrate the rate input potential, and then to use a conventional position servo both to follow the output potential of the integrator and to operate a potentiometer to multiply the integrator output by itself, thereby deriving the desired "square" potential. This proposed prior system offers some improvement over the aforementioned system but sometimes still suffers from several important defects. The use of the potentiometer on the position servo introduces electromechanical errors in the magnitude of the "square" signal, and drift of the electronic integrator may cause large, unacceptable errors, since drift errors appear in squared form at the output terminals of such a circuit.

Further systems heretofore proposed overcome these defects of the abovementioned system but sometimes require substantial additional equipment. These improved prior art systems utilize electronic integration to provide a quantity and electronic integration to provide the square of that quantity, both from rate of change input data, together with means to "slave" one integration to the other. Such systems are undesirable in certain applications because they require two integrations, among other reasons. For further details of such a system reference should be had to application Ser. No. 805,509, filed April 10, 1959 by Robert M. Howe and assigned to the same assignee as the present invention, or to application Ser. No. 676,953, filed August 8, 1957, now abandoned, by Laurence E. Fogarty and assigned to the same assignee as the present invention.

It is a primary object of the present invention to provide improved analog computer method and apparatus responsive to a potential proportional to the rate of change of a variable and operative to provide an output potential which is commensurate with the square of said variable, in which said output potential is relatively free of electromechanical errors.

It is a further object of the invention to provide such method and apparatus which also will provide the quantity itself both as an electrical voltage and a mechanical shaft position.

Other objects of the invention will in part be obvious and will in part appear hereinafter.

The drawing illustrates an exemplary embodiment of the invention as it might be used, for example, in a flight simulator, for receiving input potentials commensurate with accelerations of a simulated aircraft along the longitudinal axis of its instantaneous flight path and for providing (1) a dynamically "clean" output potential commensurate with the square of simulated aircraft velocity, (2) an output electrical potential commensurate with aircraft velocity, and (3) an output shaft position commensurate with aircraft velocity. Most forces acting on an aircraft vary in accordance with the square of aircraft velocity, so it is important in constructing a realistic and accurate simulator that the "airspeed squared" ($V^2$) quantity be derived as free as possible from electromechanical errors.

A potential commensurate with the component of aircraft engine thrust acceleration is applied at terminal 11 via summing resistor R–11, a potential commensurate with simulated profile drag acceleration is applied at terminal 12 via resistor R–12, a potential commensurate with a simulated component of weight is applied at terminal 13 via summing resistor R–13, and a potential commensurate with simulated induced drag acceleration is applied at terminal 14 via summing resistor R–14, each of the components being taken along the longitudinal axis of the simulated aircraft flight path or "wind" axis. In actual flight simulators other acceleration input potentials are often applied, but those shown in FIG. 1 will serve to illustrate operation of the present invention. The direct potentials mentioned above all are algebraically summed by a conventional summing circuit shown as comprising operational amplifier U–1 and feedback resistor R–15, thereby providing an output potential at terminal 16 commensurate with the total acceleration of the simulated aircraft. The total acceleration potential V is applied to excite the winding of potentiometer R–16, the arm of which is positioned in accordance with simulated velocity V, in a manner to be explained below, thereby deriving a potential commensurate with $V\dot{V}$ on the arm of the potentiometer. This potential is applied via scaling resistor R–17 to the input terminal 17 of a conventional electronic integrator shown as comprising amplifier U–2 and feedback capacitor C–10. It will be seen that integrating the $V\dot{V}$ potential with respect to time will provide a $V^2$ output potential at terminal 18. As described in detail thus far, the present system is identical to either the Fogarty system of application Ser. No. 676,953 or to the Howe system of application Ser. No. 805,509. The output potential may be modified in accordance with air density by applying the potential to excite a potentiometer to multiply the $V^2$ potential to provide a signal proportional to dynamic pressure. It would at first appear that such a potentiometer multiplication would insert "noise" in the signal, but since air density varies so slowly, such multiplication ordinarily does not cause an objectionable amount of "noise."

The $V^2$ output potential at terminal 18 is applied via scaling resistor R–18 to the input circuit of a conventional position servo shown in block form at M–10. The error signal on input conductor 19 of the servo is amplified and utilized to excite the servo motor (not shown), which positions servo output shaft 20 through conventional speed reduction gearing (not shown). Output shaft 20 is mechanically connected to position the arms of potentiometers R–19 and R–20, as well as the arm of potentiometer R–16 previously mentioned, and the arms of further potentiometers (not shown) used to modify various simulator quantities in accordance with simulated velocity V. The winding of potentiometer R–19 is excited by a constant potential from the computer power supply (not shown), and the potential proportional to the position of shaft 20 derived on the arm of potentiometer R–19 is applied to excite the resistance element of potentiometer R–20, deriving a potential on the arm of potentiometer R–20 commensurate with the square of the shaft position of shaft 20. This rebalancing potential is applied via scaling resistor R–21 to input conductor R–21, to be balanced against the $V^2$ potential applied via resistor R–18. It will be seen that servo M–10 will rotate shaft 20 until the potential applied to conductor 19 via resistor R–21 will be equal in magnitude and opposite in polarity to the potential applied to conductor 19 via resistor R–18, under which conditions the position of shaft 20 will be commensurate with simulated velocity V. Receiving an independent input potential commensurate with $V^2$ and providing an output shaft position commensurate with V, it will be seen that servo M–10 is connected to provide a square root function.

The required $V^2$ potential is present at terminal 18, shaft 20 provides the desired V output shaft position, and the desired V electrical potential is available at the arm of potentiometer R–19. If desired, linear potentiometers R–19 and R–20 may be replaced by a single "square function" potentiometer, and in that case, a further linear potentiometer (not shown) mechanically operated by shaft 20 must be provided if an output potential directly proportional to V is needed.

The squared output potential ($V^2$) at terminal 18 will be seen to be dynamically "clean" since it appears at the output circuit of an electronic integrator. It will be seen that even though finite resolution and backlash associated with potentiometer R–16 will provide a $V\dot{V}$ potential which includes some electromechanical "noise" at resistor R–17, step increases or jumps in that potential will be filtered by the electronic integrator circuit, so that such step increases or jumps will appear merely as changes in slope and not of magnitude at output terminal 18, and further, since no potentiometer-derived drift correction signals need be applied to the electronic integrator, no noise need be introduced to accomplish drift correction. It will be seen that the input signal for servo M–10 is derived solely from the output circuit of the electronic integrator. If the electronic integrator drifts, changing the value of the $V^2$ potential at terminal 18, servo M–10 follows the drifted potential, insuring that the V shaft position and V voltage remain in agreement with the $V^2$ potential at terminal 18.

As shown connected in the drawing, the "loop gain" of servo M–10 will vary with the value of V, which under some conditions may either make servo M–10 act sluggishly at low values of V or saturate at high values of V. To overcome this tendency if it is deemed troublesome in some embodiments of the invention, the M–10 servo error signal may be modified by means of a further potentiometer. If conductor 19 in the FIGURE is opened at point X, so that potentiometer R–22 is connected into the circuit, provision of the proper function winding on potentiometer R–22 will serve to maintain servo M–10 loop gain substantially constant over a wide operating range. Potentiometer R–22 should vary the servo input error signal inversely in accordance with simulated airspeed V.

Servo M–10 may comprise any one of a number of known types of position servomechanisms. One type commonly used in flight simulators and well-suited for many applications utilizes a magnetic amplifier which modulates as well as amplifies the D.C. error signal at point X, and an alternating current induction servomotor. Servo M–10 may be provided with a number of well-known refinements, such as tachometer or other rate feedback for stabilization, limit stops and other devices.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Analog computer apparatus for providing an output potential which varies in accordance with the square of an independent variable from an input potential which varies in accordance with the time rate of change of said variable, in which said output potential is substantially free from "noise" caused by mechanical limitations comprising in combination; a first potentiometer connected to be excited by said input potential and having a contact positioned to derive a first voltage; an electronic integrator comprising an electronic amplifier having a feedback capacitor, said integrator being connected to integrate said first voltage with respect to time to provide said output voltage, a position servomechanism responsive to said output voltage and to a rebalancing potential and operative to provide an output shaft position commensurate with said independent variable, said servomechanism including non-linear squaring potentiometer means operable in accordance with said shaft output position to provide said rebalancing potential, said rebalancing potential varying in accordance with the square of said output shaft position, said contact of said first potentiometer being mechanically connected to be positioned by said output shaft position.

2. Apparatus according to claim 1 in which said servomechanism includes means for comparing said output voltage and said rebalancing potential to provide an error potential, and further potentiometer means mechanically operated in accordance with said output shaft position and electrically connected to modify said error signal inversely in accordance with the value of said independent variable.

3. Apparatus according to claim 1 in which said input potential is commensurate with simulated accelerations of an aircraft and in which said output potential is commensurate with simulated airspeed squared of said aircraft.

4. Analog computer apparatus for providing an output potential which varies in accordance with the square of an independent variable from an input potential which varies in accordance with the time rate of change of said variable, in which said output potential is substantially free from "noise" caused by mechanical limitations, comprising in combination; a square root position servomechanism and a first potentiometer connected to modify said input potential in accordance with the output shaft position of said servomechanism to provide a second potential; an electronic integrator comprising an electronic amplifier and a feedback capacitor connected to integrate said second potential with respect to time to provide said output potential; said position servomechanism being connected to receive said output potential and to position said first potentiometer mechanically in accordance with the square root of said output potential.

5. Apparatus according to claim 4 in which said servomechanism includes means for comparing said output potential with a rebalancing potential to provide an error potential, means for deriving a rebalancing potential commensurate with the square of said output shaft position, and further means operable in accordance with said output shaft position to modify said error signal, thereby to maintain loop gain of said servomechanism substantially constant.

References Cited in the file of this patent

OTHER REFERENCES

"Problem Solving with the Analog Computer," Lakatos, March 1951, Bell Laboratories Record, pp. 109–114.